UNITED STATES PATENT OFFICE.

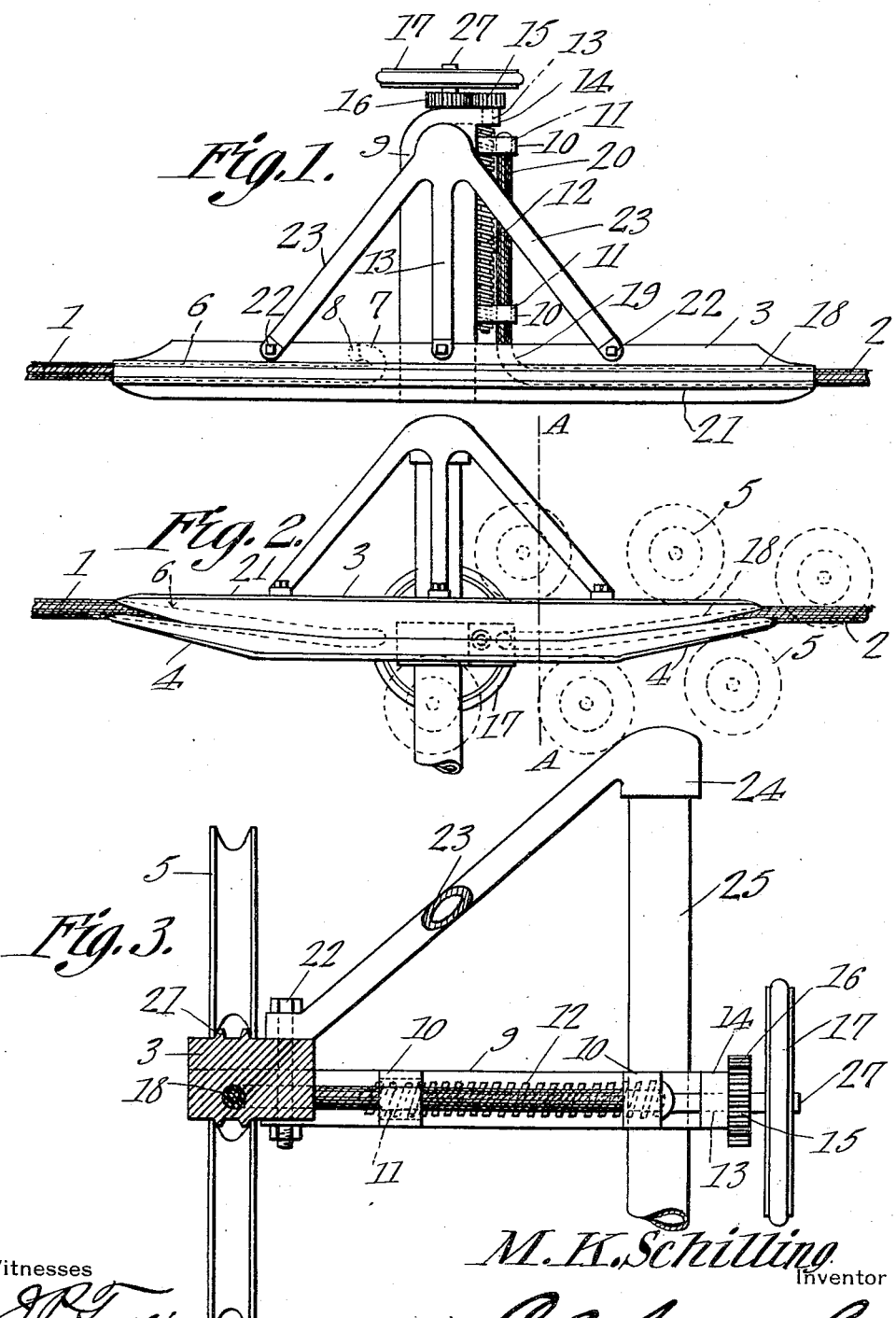

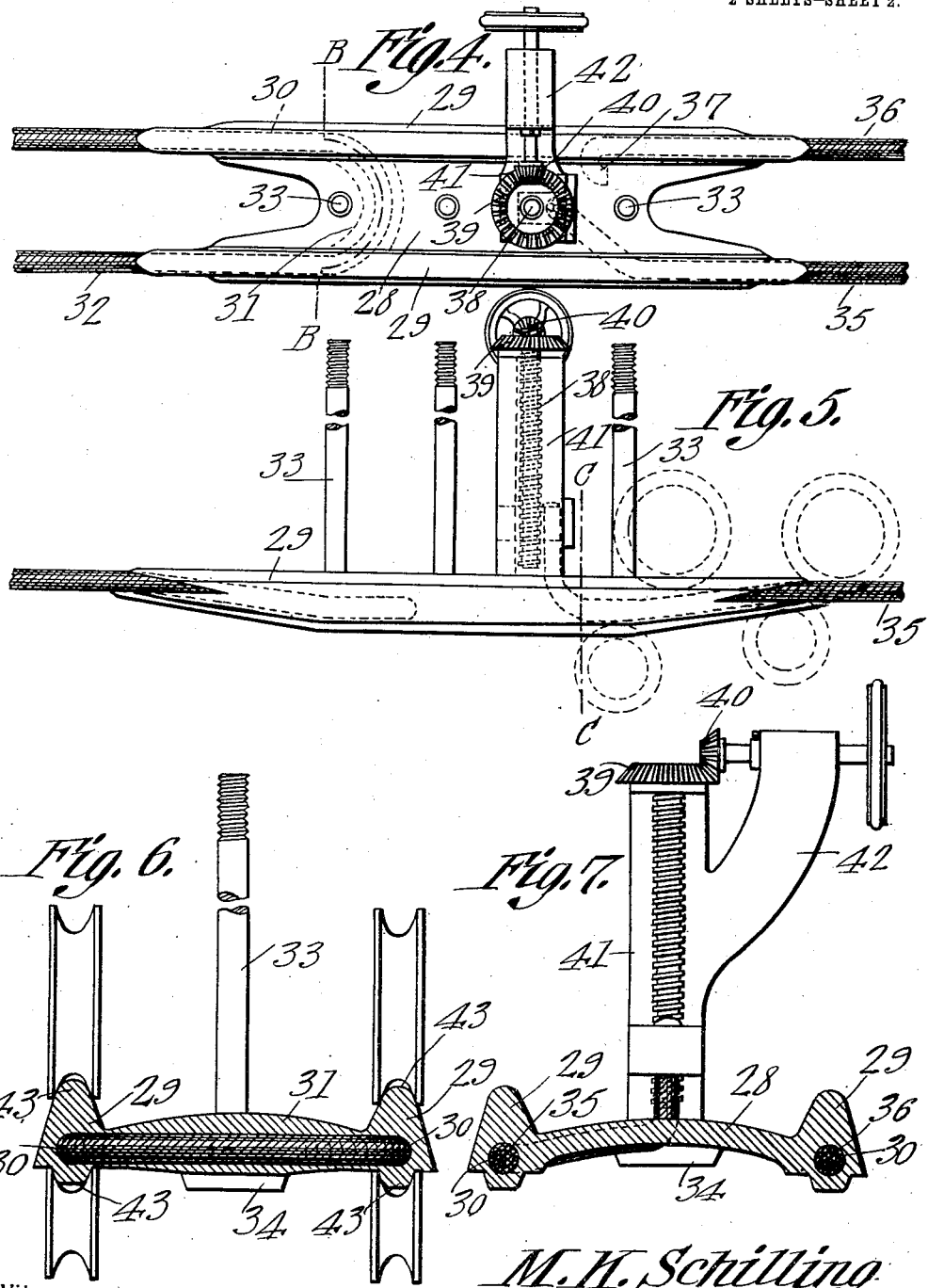
M. K. SCHILLING.
CABLE CONNECTOR.
APPLICATION FILED MAY 17, 1913.
1,086,227.
Patented Feb. 3, 1914.
2 SHEETS—SHEET 2.

MATTHEW K. SCHILLING, OF NEW ORLEANS, LOUISIANA.

CABLE-CONNECTOR.

1,086,227.  Specification of Letters Patent.  Patented Feb. 3, 1914.

Application filed May 17, 1913. Serial No. 768,325.

*To all whom it may concern:*

Be it known that I, MATTHEW K. SCHILLING, a citizen of the United States, residing at New Orleans, in the parish of Orleans and State of Louisiana, have invented a new and useful Cable-Connector, of which the following is a specification.

This invention relates to improvements in cable connectors.

An object of the present invention is to provide a connector for the ends of a cable whereby the continuity of the cable will be maintained.

A further object is to provide a cable connection with means for securing the same rigidly to the meeting ends of a cable and to furthermore provide means whereby one of the cables may be tightened.

A further object is to provide a sleeve with longitudinal openings extending therein and in which openings are adapted to extend the meeting ends of a cable one of the said cables terminating therein and rigidly secured thereto, the end of the other cable projecting through the opening and passing out through the side wall of the connector and held in forced contact with a threaded rod whereby the cable may be tightened or loosened by the rotating of the said threaded rod.

A further object is to provide a connector with tracks extending along the lower and upper surface thereof, which tracks are adapted to act in the capacity of the cable at those points in which the cable is embedded with under the surface of the connector.

A further object is to provide a cable connector for the securing and tightening of the meeting ends of a double cable system.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the drawings accompanying this specification and forming a part thereof, the preferable form of my invention is illustrated, in which:—

Figure 1 is a top plan view of my improved cable connector. Fig. 2 is a side view in elevation thereof. Fig. 3 is a vertical cross sectional view, taken on the line A—A of Fig. 2. Fig. 4 is a top plan view of a somewhat similar cable connector to be used in connection with systems employing two cables. Fig. 5 is a side elevation of the form shown in Fig. 4. Fig. 6 is a cross sectional view taken on the line B—B of Fig. 5. Fig. 7 is a cross sectional view taken on the line C—C of Fig. 5.

Referring to Figs. 1, 2 and 3 of the drawings in which similar reference numerals designate corresponding parts throughout the several views, 1 is a cable such as is used in connection with overhead trolleys and 2 is the adjacent end of a similar cable, the connector being adapted to secure and hold in adjusted position the ends of the cables 1 and 2.

The connector comprises a body portion 3 preferably in the form of a rod or bar the lower surface thereof being substantially parallel to the upper, with the exception of the beveled portions 4 at the ends of the connector. The beveled ends 4 are adapted to spread the wheels of a trolley illustrated in dotted lines at 5, apart, so that the body portion of the connector can be made of a sufficient depth to allow the cable to pass through the side wall thereof, without materially weakening the connector which, it may be stated in this connection, is also adapted to support the cables.

The body portion 3 of the connector is provided with the opening 6 extending therein and which opening is provided with a hooked portion 7 adjacent the central portion of the connector and terminates in the enlarged end 8. The cable 1 is insertible within the opening 6 and by suitably forcing the same, it assumes a position within the hooked end 7 of the opening and by solder or by crimping the body portion down upon the cable, provides that the end 1 of the cable will be rigidly secured within the said opening.

In order that one of the cables may be tightened or loosened with respect to the connector, a bar 9 is rigidly secured to the body portion or formed integral therewith and extends at right angles therefrom and in a substantially horizontal manner. The bar 9 is provided with outstanding lugs 10 which are provided with the cable receiving apertures 11 therein. The cable receiving apertures 11 are of sufficient width to also accommodate the threaded rod 12 therein, which rod is journaled within an opening 13 formed in an outstanding boss 14. Rigidly secured to the upper extremity of the rod 12 is a spur gear 15 meshing with a similar gear 16, the latter gear being rigidly connected to a manually operable wheel 17.

The body portion 3 of the connector is provided with a longitudinal aperture 18 extending therein and which aperture curves outwardly as at 19 so that the cable 2 which passes through the restricted end of the body portion due to the beveling 4, passes through the aperture 18 and out of the cross opening 19 and extends through the cable receiving apertures 11 as illustrated in Figs. 1 and 3. The end 20 of the cable is therefore in contact with and rigidly engaged by the threaded portion of the rod 12 and is adapted to be engaged thereby.

In order that the cable connector may act in the capacity of a support for the cable and at the same time not interfere with the passing of the car wheels 5 thereover, the upper and lower surface of the body portion 3 is provided with the upstanding flanges 21 which are adapted to extend within the grooved portions of the wheels 5 as illustrated in Fig. 3 and act as a guide or track therefor. Rigidly secured to the body portion 3 by means of a bolt 22 or similar holding means is the suspending truss member 23 which extends upwardly from the body portion 3 and is provided with a head 24 at the upper extremity which is adapted to engage and be supported by a suitable post 25. The post 25 extends downwardly through a suitable opening 26 in the bar 9 from which it will be apparent that the truss member 23 and the bar 9 form a triangular support with the post 25 for the body portion of the connector, from which it will be apparent that there will be no bending moment brought to bear on the truss member 23, the only force acting thereupon being in the nature of a tensional stress.

From the foregoing it will be apparent that in my improved cable connector one end of a cable is rigidly secured to the connector and the other end of the cable passes longitudinally through the connector for a limited distance and then projects at right angles therefrom and is engaged by a threaded rod, the rotation of which will draw the cable in one direction and suitably tighten the same. The manually operable wheel 17 is suitably journaled upon a shaft 27 to which the said spur gear 16 is connected. The spur gear 16 is adapted to mesh with the spur gear 15 so as to produce a rotation of the threaded rod 12 to thereby either advance or retract the cable 2 with respect to the cable 1. The beveled under surface of the body portion allows the wheels of the car to be gradually spread apart in passing over the connector and at the same time allows the connector to be made of some depth so as to lend sufficient rigidity and strength thereto.

Figs. 4, 5, 6 and 7 are similar embodiments of my invention and illustrate a cable connector to be used with systems employing double cables. Referring more particularly to these figures, the web 28 is provided with the longitudinally extending side rails 29 which are provided with the apertures 30 extending therethrough and which apertures are adapted to receive the cables therein. With the cable connector designed for use with two cable systems, the web 28 adjacent one end thereof is provided with a boss 31 so that the cables 32 may pass into one side of the cable connector, through the boss 31 and out of the aperture upon the opposite edge of the cable connector, from which it will be apparent that the two cables of the systems will in fact be a single cable doubled upon itself and slidably held at the doubled end to the cable connector. A single tightening means is therefore all that is required for the stretching and tightening of the two halves of the single cable. The web 28 is provided with suitable suspending means which in the present instance takes the form of the suspending rod formed with an enlarged head 34, the same extending beneath and supporting the said web. The meeting ends of a single cable 35 and 36 are illustrated as being connected to the cable connector the end 36 terminating in the hook 37 and secured thereto as previously explained in connection with Figs. 1, 2 and 3 of the drawings. The end 35 passes to the central portion of the web as illustrated in Fig. 7 and thence upwardly into engagement with a threaded rod 38 which is provided with a beveled gear 39 in engagement therewith and which is adapted to be actuated by the manually rotatable beveled gear 40. From the foregoing it will be apparent that the end 35 of the single cable may be tightened and the tightening will extend back to the next adjacent cable connector so as to produce a similar tension or tightening effect upon the intervening span of the portion 36 of the cable. The threaded rod 38 is supported upon a suitable standard 41 the same being provided with an offset arm 42 which rotatably supports the beveled gear 40. The side rails of the connector 29 are similar to what has been termed the body portion of the cable connector for a single cable and are provided with the upper and lower guiding surfaces 43 the same taking the place of the cable and acting in a similar capacity for the guidance and supporting of the car wheels at those places in which the cables are embedded beneath the surface of the rails. The ends of the rails are beveled and are adapted to spread the wheels of the car apart for the passing thereover, it being noted that the cars to be used in connection with my improved cable are either of the ordinary type or may be so designed that the upper and lower wheels may be spread apart for the passing thereover of a cable connector.

Having thus fully described my invention what I claim to be new and original with me is:—

1. A device of the class described including a body portion, openings extending longitudinally thereof and terminating at the ends of said body portion, one of said openings adapted to receive a cable therein and to be rigidly secured thereto, the other of said openings extending through the side wall of said body portion, and means for engaging the cable which extends through the body portion side wall, and means for tightening the same.

2. In a cable connector and supporter, the combination of a body portion, a cable extending within one end thereof and rigidly secured therein, a cable extending within the other end of said body portion and passing through the side wall thereof, means for engaging said cable as it extends beyond the side wall of said body portion, said means adapted to grip the said cable and to exert a tensional stress thereon, and means for supporting the said body portion.

3. In a cable connector and supporter, the combination of a body portion, a bar extending at right angles therefrom, a suspending member extending upwardly from the said body portion and adapted to engage a post thereabove, said post extending through an aperture formed in the said bar, means for securing one end of a cable to the body portion, means for securing the end of an adjacent cable to the body portion, said last mentioned means including a threaded rod rotatably secured to the said bar, said threaded rod adapted to exert a tensional stress upon the said cable.

4. A cable connector and supporter comprising a body portion with openings extending inwardly from the ends thereof, the ends of said body portion beveled downwardly and adapted to spread apart the wheels of a car as it passes thereover, one of said cables rigidly secured within one of the said openings, the other cable passing through the said openings and passing out through the side wall of the body portion, a bar extending from the said body portion and provided with means secured thereto adapted to rigidly engage the end of the said last mentioned cable and to exert a tensional stress thereon, and means extending from said body portion adapted to engage the end of a post thereabove.

5. A cable connector comprising a body portion, openings extending longitudinally thereof inwardly from the ends, one of said openings stopping short of the center of the body portion and provided with a hooked end, a cable fitting within the hook ended opening and rigidly secured therein, the other of said openings terminating short of the center of the body portion and extending outwardly through the side wall thereof, a bar extending from the said body portion and provided with a threaded rod journaled thereto, a cable adapted to extend through the last mentioned opening through the side wall of said body portion and to contact with and be engaged by said threaded rod, means for manually rotating the said rod to exert a tensional stress upon the said cable, and means for supporting the body portion.

6. In a cable connector and supporter, the combination of a body portion provided with inwardly extending longitudinal openings, one of said openings terminating in a hook-shaped end short of the center of the body portion, a cable rigidly secured therein, the other one of said body portion openings extending through the side wall thereof, a threaded rod journaled in front of the said side wall opening and adapted to engage a cable as it passes therefrom, means for manually rotating the said threaded rod to thereby exert a tensional stress upon the cable, the ends of the said body portion beveled to therefore force a series of car wheels apart, guide tracks extending along the upper and lower surface of said body portion and adapted to guide the wheels of a car thereover after the same have left the ends of the cable, and means for supporting the said body portion from a point thereabove.

7. A cable connector and supporter comprising a body portion provided with openings extending inwardly from the ends thereof, one of said openings terminating in a hook-shaped end short of the center and adapted to engage and secure a cable end rigidly therein, the other of said openings terminating short of the center and extending transversely of the body portion through one side wall thereof, a bar extending outwardly from the said body portion and provided with outstanding lugs thereon, a threaded rod journaled in one of said lugs, said threaded rod adapted to contact with and threadedly engage the surface of a cable issuing from the said side wall opening, means for manually rotating the said threaded rod to thereby exert a tensional stress upon the said cable, a truss member extending upwardly from the said body portion and secured to the end of a post thereabove, a post extending through an opening provided in the said bar to thereby form a triangular support for the said body portion.

8. A cable connector comprising a web, rails extending along the side edges thereof, said rails provided with longitudinal apertures extending therethrough adapted to receive therein the ends of the cable, and means extending upwardly from the said web adapted to engage the free end of the cable and to exert a tensional stress thereupon.

In testimony that I claim the foregoing as my own, I have hereto affixed my signature in the presence of two witnesses.

MATTHEW K. SCHILLING.

Witnesses:
T. J. NEUMANN,
R. W. BLACK.

Copies of this patent may be obtained for five cents each, by addressing the "Commissioner of Patents, Washington, D. C."